United States Patent
Ting et al.

(10) Patent No.: US 7,360,813 B2
(45) Date of Patent: Apr. 22, 2008

(54) MOBILE FIRST AID POST

(76) Inventors: Choon Meng Ting, 4 Sin Ming Road, #10-02, Sin Ming Plaza, Singapore 575584 (SG); Koon Hou Mak, 18b, Balmoral Crescent, Singapore 259914 (SG)

( * ) Notice: Subject to any disclaimer, the term of this patent is extended or adjusted under 35 U.S.C. 154(b) by 178 days.

(21) Appl. No.: 10/540,905

(22) PCT Filed: Dec. 24, 2003

(86) PCT No.: PCT/SG03/00292

§ 371 (c)(1), (2), (4) Date: Jun. 27, 2005

(87) PCT Pub. No.: WO2004/058128

PCT Pub. Date: Jul. 15, 2004

(65) Prior Publication Data

US 2006/0087151 A1 Apr. 27, 2006

(30) Foreign Application Priority Data

Dec. 27, 2002 (SG) ............................. 200207824

(51) Int. Cl.
*A61G 3/00* (2006.01)

(52) U.S. Cl. .................. 296/24.38; 296/26.15; 296/65.05

(58) Field of Classification Search .......... 296/165, 296/24.38, 26.12, 26.13, 26.14, 26.15, 163, 296/65.05, 69; 5/119; 52/36.1
See application file for complete search history.

(56) References Cited

U.S. PATENT DOCUMENTS

| | | | | |
|---|---|---|---|---|
| 2,765,499 A | * | 10/1956 | Couse | ............................. 52/66 |
| 3,217,366 A | * | 11/1965 | Wenger | .............................. 52/6 |
| 4,057,284 A | * | 11/1977 | Blank | ............................ 296/169 |
| 4,915,435 A | * | 4/1990 | Levine | ...................... 296/24.38 |
| 5,375,899 A | * | 12/1994 | Wright | ......................... 296/21 |
| 5,478,129 A | | 12/1995 | Goto et al. | |
| 5,755,479 A | * | 5/1998 | Lavin et al. | .............. 296/24.38 |
| 5,964,065 A | * | 10/1999 | Migurski et al. | .............. 52/64 |
| 6,223,479 B1 | * | 5/2001 | Stockli | ............................ 52/68 |
| 2002/0135193 A1 | * | 9/2002 | Shaw | ......................... 296/24.1 |
| 2004/0201239 A1 | * | 10/2004 | Pellegrin, Jr. | ............. 296/24.38 |
| 2007/0102946 A1 | * | 5/2007 | Blackwell et al. | ........ 296/24.38 |

FOREIGN PATENT DOCUMENTS

| | | |
|---|---|---|
| RU | 2144812 | 1/2000 |
| SU | 762318 | 12/1982 |

* cited by examiner

Primary Examiner—Jason S Morrow
(74) Attorney, Agent, or Firm—Wells St. John P.S.

(57) ABSTRACT

A mobile first aid post comprising a road vehicle having a compartment of an openable enclosure for housing medical supplies and equipment, the compartment including a fixed structure and at least one rigid panel pivotally movable relative to the fixed structure between a closing condition where the panel defines at least part of a side wall of the enclosure and an erected condition where the panel is in a substantially or near horizontal condition creating an opening and providing a region covered overhead for a person positioned adjacent the side of the vehicle, and wherein medical utilities selected from one or more of compressed air, suction, water, and oxygen are provided accessible by a user from the downwardly facing major surface of the panel aiding in the treatment of patients positioned below the panel. The panel may also be of an extendable type. Sideboards may also be included acting as a seat to personnel inside the compartment in a first condition and as a step up for people entering and leaving the compartment in a second condition.

22 Claims, 10 Drawing Sheets

MOBILE FIRST AID POST

RELATED PATENT DATA

This application claims priority to Patent Cooperation Treaty application Serial No. PCT/SG2003/000292, which was filed Dec. 24, 2003, and which claims priority to Singapore Application Serial No. 200207824-4, which was filed Dec. 27, 2002.

TECHNICAL FIELD

The present invention relates to a mobile first aid post.

BACKGROUND ART

The current invention is an improvement to what is known as a First Aid Post (FAP). In medical emergencies and in particular in disaster and combat situations, the most common form of establishing an FAP is based on an Israeli model which is commonly referred to as the "twenty-men tent FAP". An FAP is set up proximate to a region where emergency medical treatment is required to be provided. The general set up for a FAP consists of a tent that is erected within which medical treatment is able to be performed, medical supplies are able to be stored and medical services are able to be conveniently dispensed, in the tent. Medical supplies are delivered to the tent once this has been erected.

An FAP is not a combat hospital. A combat hospital is a much more extensive setup which is provided close to, but safely away from the region where casualties are initially congregated, such as at the frontline. In a war situation, the purpose of a combat hospital is to receive casualties from the front line for further stabilisation and subsequent transfer to a base hospital for definitive treatment. An FAP on the other hand is established much more proximate to the region where casualties have occurred and is an intermediate step for the treatment of casualties.

As part of many medical emergency situations a Triage area is usually established. Triage is a term to describe a region where casualties are gathered for a brief medical assessment by medical orderlies prior to the casualties being prioritised and moved to another region for treatment.

In a twenty-men tent FAP, triage is established outside of the tent. Once the brief assessment has been made, the casualties are moved into the tent from triage area for the purposes of treatment. No triage region is provided within a twenty-men tent FAP. Accordingly it is an object of the present invention to provide improvements to a mobile FAP which is quick and simple to become operative at an emergency site or which will at least provide the public with a useful choice.

DISCLOSURE OF INVENTION

Accordingly in a first aspect the present invention consists in a mobile first aid post comprising
 a road vehicle
 a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition,
 wherein medical utilities selected from one or more of compressed air, suction, water, and oxygen are provided accessible by a user from the downwardly facing major surface of said at least one panel when in said erected condition for the purposes of or aiding in the treatment of patients positioned below said at least one panel.

Preferably said at least one panel includes a conduit for each of said medical utilities to allow utilisation of said medical utility below said at least one panel when in said erected condition, said conduit extending between a first end at or disposed from said downwardly facing major surface of said at least one panel and a second end engaged or engagable to a source for the supply of said utility carried by said vehicle.

Preferably each said first ends of said conduit(s) are located at said at least one panel and are presented to allow for convenient engagement of an extension conduit thereto, such that each extension conduit can hang down from said panel and can be manipulated by a user for appropriate positioning to deliver the medical utility as desired.

Preferably said extension conduit is a flexible conduit.

Preferably said extension conduit includes a utility supply control means.

Preferably said at least one panel at said downwardly facing major surface includes lighting means which can be energised for the provision of light to the area below said at least one panel when in the erected condition.

Preferably said conduit(s) are dependent from said at least one panel in an extendable manner therefrom, able to be drawn by a user as and when desired from said panel and retractable therewithin when not desired for use.

Preferably said fixed structure of said compartment includes a floor structure and a frame defining cage structure extending from said floor structure to support vertical side walls, and a roof defining said enclosure, said at least one panel forming part of at least one side wall and hinged relative to said frame structure at or proximate to said roof about a horizontal axis.

Preferably said compartment is engaged to said vehicle positioned above the axles of said vehicle and extends longitudinally with respect to said vehicle from the rear of the vehicle and towards the front of said vehicle, the compartment when in the closed condition, being of a width (lateral to said longitudinal direction) substantially similar to the width of said vehicle.

In a second aspect the present invention consists in a mobile first aid post comprising
 a road vehicle
 a compartment carried by said vehicle, defining a generally boxed shaped openable enclosure for housing medical supplies and equipment, said compartment including a fixed structure and at least one rigid movable panel which is movable. relative to said fixed structure between a condition closing a side of said enclosure hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition, wherein an extension panel is movably engaged to each said at least one movable panel to move between a collapsed condition and an expanded condition wherein said extension panel is outwardlying of said at least one panel and said enclosure to define a total said region covered overhead greater than that provided by said at least one panel alone.

Preferably said extension panel is a rigid panel and when in a collapsed condition overlies said at least one movable panel.

Preferably said extension panel is horizontally hinged to said at least one movable panel to overly one of said major surfaces of said at least one panel when in said collapsed condition.

Preferably said extension panel is hinged to said at least one panel to extend in said extended condition, substantially parallel to said at least one panel.

Preferably a straight edge of said extension panel is engaged to a straight edge of said at least one movable panel.

Preferably said extension panel is telescopically movable to said at least one panel.

Preferably said at least one panel includes a cavity into which said extension panel is able to be retracted.

Preferably said at least one panel is of a quadrilateral plan shape and said extension panel is of a slightly smaller plan shape to said at least one panel.

Preferably said at least one panel and said extension panel are in an edge to edge juxtaposition to each other when in the expanded condition without any significant gap existing between said at least one panel and said extension panel.

Preferably said at least one panel includes means for supply of medical utilities selected from one or more of compressed air, suction, water, and oxygen which are accessible by a user for the treatment of patients from the downwardly facing major surface of said at least one panel when in said erected condition.

In a further aspect the present invention consist in a mobile first aid post comprising a road vehicle a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition, said panel providing an opening to said enclosure when in said erected condition which extends substantially to a floor of said enclosure a seat structure pivotably mounted to said fixed structure proximate or at said floor to, in a first pivotal condition present a substantially horizontal support surface above the surface of said floor to allow a person within said enclosure to be sedentary thereon and in a second pivotal condition different to the first, present a substantially horizontal surface intermediate of said floor and the ground adjacent said vehicle to allow a person to be supported thereon.

Preferably said seat structure includes a first member engaged to said floor at a pivot means and a seat member rigidly extending from said first member, said seat member has in said first rotational condition, a first surface thereof positioned substantially horizontally and upwardly facing within said enclosure to allow a person to be sedentary thereon and a second surface opposite to said first surface positioned horizontally and upwardly facing when said seat structure in said second rotational condition and located substantially outwardly of said enclosure to present said second horizontal surface as a step between said floor structure and the ground on which said vehicle is positioned.

Preferably seat structure is engaged to said floor structure to be entirely within said enclosure in said first rotational condition.

Preferably said seat structure can be rotated in an outwardly and downwardly direction relative to said compartment to said second rotational condition and is supported when in said second rotational condition against any further rotation.

Preferably said floor of said compartment is positioned at a height above said surrounding ground to said vehicle which is substantially twice the height of said second surface of said seat structure above said surrounding ground when in said second rotational condition.

Additional advantages of the present invention will become apparent in the following detailed description of the invention.

BRIEF DESCRIPTION OF DRAWINGS

FIG. 9 shows a vehicle of the FAP without the compartment.

DETAILED DESCRIPTION OF THE INVENTION

Figure 3:
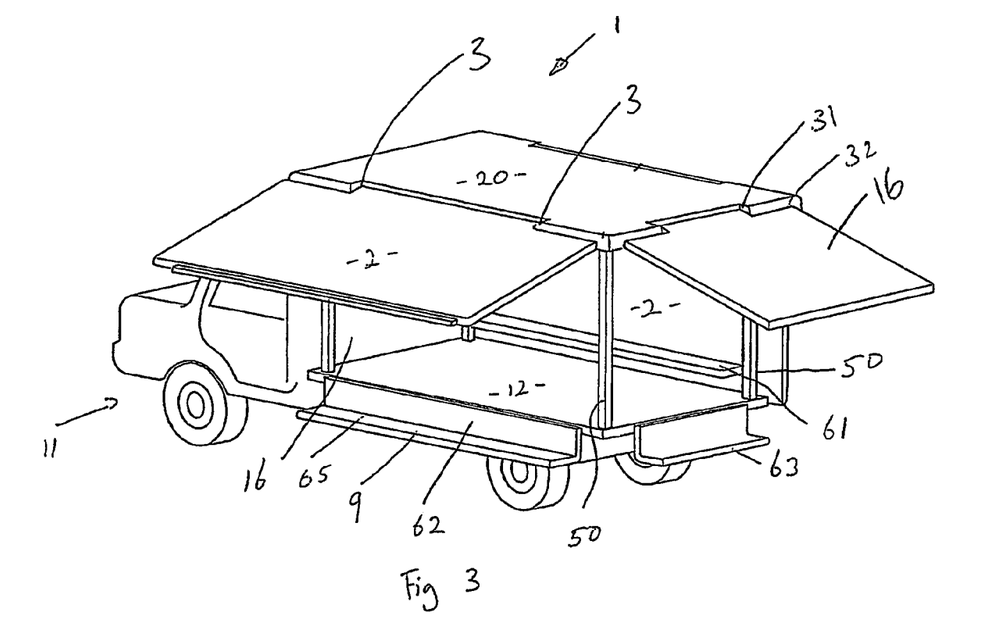
FIG. 3 is a perspective view of the FAP with the side panels extended showing the interior within the compartment but without medical equipment placed therein.

The first aid post (FAP) of the current invention consists of a vehicle 11 which carries a compartment 1 as for example shown in FIG. 3.

The vehicle is a road transport type vehicle which will include a cabin within which a driver and passengers can be seated. The cabin is positioned appropriately to allow for a driver to safely control the vehicle and to drive the FAP to a desired destination. The vehicle will have at least two pairs of wheel or at least one pair of tracks which are coupled to an engine to allow for the vehicle to move on its own accord.

The vehicle preferably provides a cabin towards the front end of the vehicle and provides a chassis extending from its rear towards the cabin for the purposes of supporting a compartment 1 as shown in FIG. 3.

With the cabin positioned towards the front of the vehicle, the driver will have a clear view of the path of travel and will allow for the FAP to be safely driven to its destination.

Within or from the cabin, control of other aspects of the FAP may also be provided and indeed the engine of the vehicle may in an auxiliary mode, be used for powering other aspects of the FAP other than merely providing the power to drive the vehicle along a road or terrain. The engine may provide power for medical services requirements of the FAP.

Figure 2:
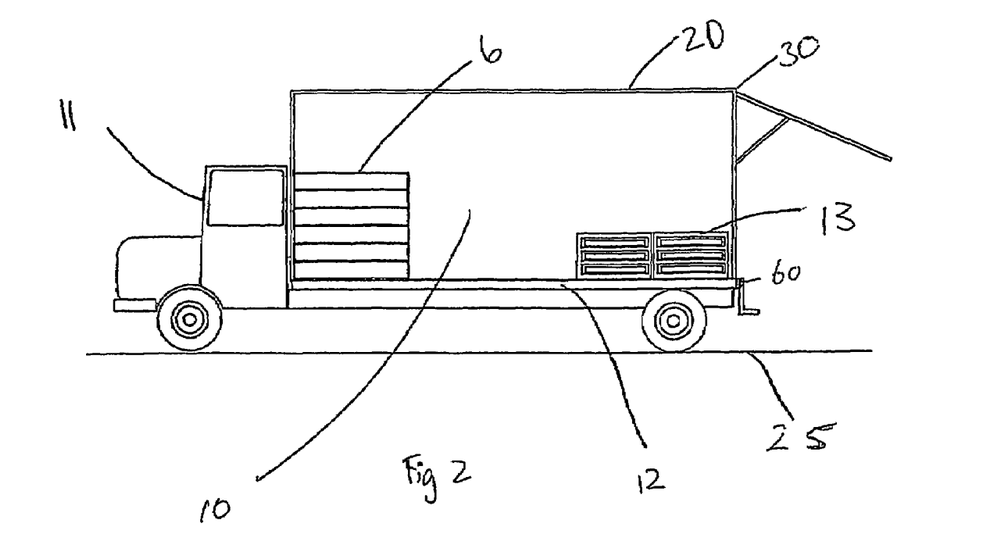
FIG. 2 is a view of the FAP provided on a truck with the side panels fully extended.

The compartment which is supported by the vehicle is a compartment which is able to store and carry medical supplies and equipment. Storage cabinets or containers 13, as shown in FIG. 2 can be carried within the compartment for the purposes of housing such medical supplies and equipment that are necessary.

The compartment defines an enclosure 10 within which such supplies and equipment can be carried and transported. The enclosure 10 is defined by for example two side walls which are substantially planar and extend in a longitudinal direction with respect to the vehicle (being in the direction of front to rear of the vehicle), at least two end walls 16 which are substantially planar and extend transverse to the side walls to close the ends of the compartment. The end and side walls are (when the compartment is in a closed condition), substantially abutting each other in a side to side relationship and extend from top to bottom between a floor panel 12 and roof panel 20. The side walls and end walls may consist of more than one panel however with reference to FIG. 3, it can be seen that the side and end walls are preferably made of one panel which can extend the entire height between the floor 12 and the roof 20.

The compartment will consist of a fixed structure which remains fixed relative to the vehicle. At least one of the side or end panels will be moveable relative to the fixed structure to allow for an opening to the enclosure of the compartment to be generated. Such a panel which is moveable relative to the fixed structure will allow for an opening to be generated to allow for equipment and personnel to be moved in/out of the then opened closure 10.

The fixed structure may consist of frame defining members which may include corner posts 50 which extend between the floor 12 and roof panel 20. Such posts may be braced appropriately or the frame structure in combination with the roof and floor may be designed to have inherent rigidity. The frame structure may also include lateral beams between the posts 50 but these have not been shown. Such a frame structure allows for the compartment to be rigid and adequately supported from the floor 12 or chassis of the vehicle and can provide support to the side and end panels of the sides of the compartment.

The posts 50 are engaged at their lower ends to the floor and at their upper ends to the roof. The posts are preferably positioned at or proximate to the corners of what is preferably a substantially square or rectangular shaped plan of the floor. The roof is preferably also of a similar shape in plan. The frame work supported by the vehicle to define the structural part of the fixed components of the compartment each define substantially rectangular shaped side walls of the compartment. The compartment may hence consist of four panels (two side panels and two end panels) and a floor and roof.

In the most preferred form when the vehicle is stationary, at least one side panel 2 and preferably both side panels of the compartment are moveable between a closed condition (wherein the sides of the compartment are substantially closed) to an opened condition wherein the side(s) of the compartment is open to the exterior of the vehicle. A side panel 2 may however be moveable relative to the fixed structure to define only part of the side wall of the compartment. The side wall of the compartment may consists of panels which remain fixed and provide a partial and permanent closure to the enclosure of the compartment and a moveable panel 2, to provide an opening to the enclosure. Such a configuration is not shown. Illustrated in the drawings is the entire side panel or panels of the compartment moveable to define an opening at the side of the compartment.

Alternatively the sides of the compartment which have the facility for creating an opening to the compartment may include more that on panel and indeed may include at least two panels which are each movable according to the way as herein described. The provision of an opening to the compartment will allow for personnel to step in and out of the compartment for the purposes of retrieving or returning medical equipment and supplies which are stored within the enclosure of the compartment. No treatment of patients occurs within the compartment when the FAP is deployed as this is not set up for treatment. Equipment or supplies may be used for the direct treatment of a patient or it may be supplies such as stretchers or beds 6 which when not in use can be stored within the enclosure of the compartment (ie; when the vehicle is in transit or in storage).

Figure 11:
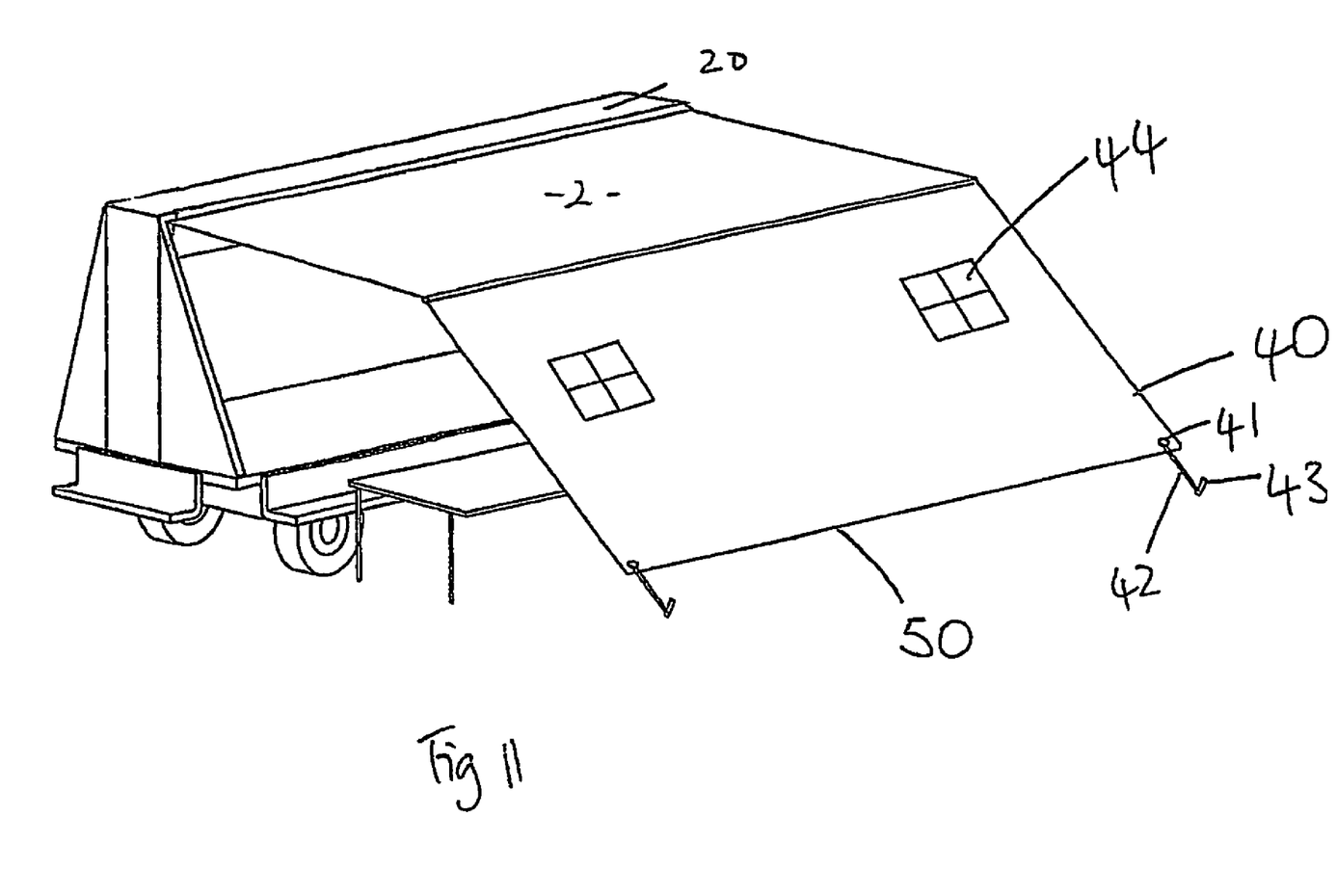
FIG. 11 shows an alternative embodiment of the FAP in a perspective view.
Figure 12:
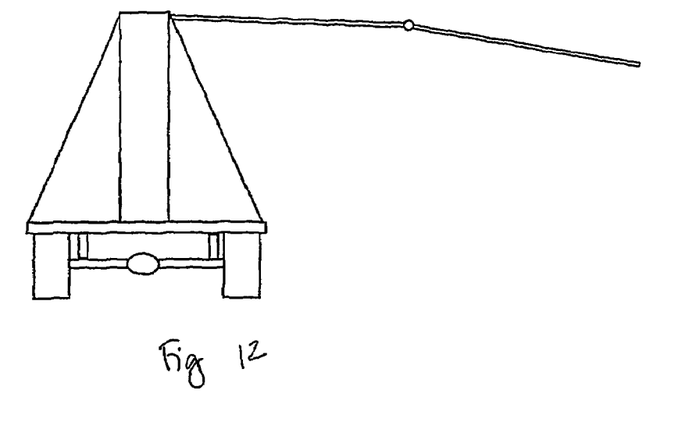
FIG. 12 is an end view of the alternative embodiment as depicted in FIG. 11

In the most preferred form, it is both side panels 2 which are moveable. They are moveable from a closed condition to close the sides of the compartment between the roof structure 20 and the floor 12. In the form as shown in FIGS. 1-8, such side walls extend in the closed condition in a substantially vertical direction. This is because the edge of the roof structure (which extends substantially longitudinally), is approximately directly above the edge of the longitudinally extending edge of the floor 12. However as can be seen in FIG. 11, the edge of the roof structure 20 may not necessarily lie vertically above the edge of the floor and hence when in a closed condition the side panels 2 may not extent substantially vertical but at an angle to the vertical.

The side panels extend substantially longitudinally and when in the closed condition preferably vertically along the side of the enclosure of the compartment. When it is desired to setup the FAP to an operative condition, (as opposed to a transport condition) at least one side panel is moved from its closed condition to an open or erected condition. In the open condition the side panel extends from the fixed structure of the compartment approximately horizontally or at a slight angle to and below (or less preferably above) the horizontal. The panel 2 (1b) is hinged to the fixed structure of the compartment so that it extends from the fixed structure at or proximate to an upper region of the fixed structure such as for example, at roof level. The provision of a hinge 3 for example at the roof 20, allows for the panel 2, to act as an overhead shelter to a person positioned below the side panel 2.

Figure 1:
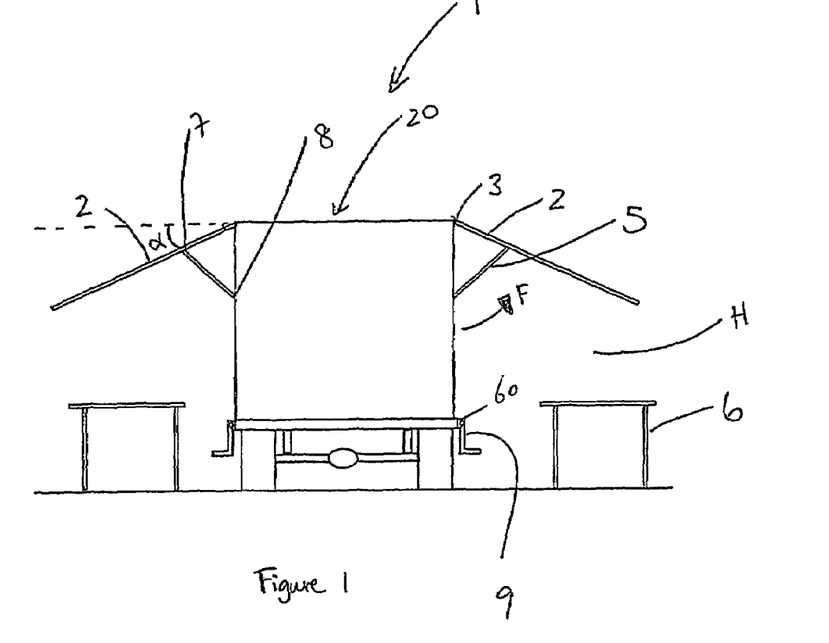
FIG. 1 shows the end view of the FAP provided on a vehicle showing the side panels of the compartment extended.

The enclosure is preferably of a height which allows for a person to be seated within the compartment and preferably also to comfortably stand on the floor within the compartment. Since the floor is positioned above surrounding ground level on which the wheels or tracks engage, when the side panel is moved to its open or erected condition as shown in FIGS. 1 and 3, a person standing on surrounding ground adjacent the vehicle will also be able to stand freely beneath the cover of the side panel which extends above their head.

The compartment is preferably supported on a chassis or frame of the vehicle such that it is entirely supported above the wheel base. The floor 12 is hence positioned at a height above the surrounding ground on which the vehicle is positioned. This will require for a person to make a step up to the floor of the vehicle from the surrounding ground.

When the side panel 2 is in its erected condition the panel is positioned above a person standing adjacent the vehicle. The expanse of the panel is such that a person position adjacent the vehicle will receive shelter from the elements which may be impinging on the panel from above.

In the preferred form where the height of the compartment is sufficient to allow for a person to stand therein, the panel when in its substantially horizontal direction extending in the erected condition from the enclosure of the compartment will be of a width similar to the height of the compartment.

With reference to FIG. 3, it can be seen that an end panel 16 positioned at the rear of the vehicle is also moveable between a closed condition and an open condition. The movement of such a panel will provide an additional opening to gain access into the interior of the compartment, however in a broad sense, such a rear panel may remain fixed to provide a permanent closure of the end face of the compartment.

The cabinets and other medical equipment contained within the enclosure of the compartment may be mounted on the floor so that during transportation it remains securely affixed to the compartment. Rails 49 as for example, shown in FIG. 7 may be utilised to position the cabinets or trays of medical supply equipment and allow such cabinets to be fastened to the floor 12 as desired. With the provision of rails 49, the cabinets can be displaceably secured to the floor structure of the compartment. Hence the position of cabinets and supply equipment within the compartment can be adjusted to suit the requirements and needs of a particular situation. Indeed the cabinets and other equipment which is contained within the compartment of the FAP may be removable from the compartment. By allowing the cabinets and equipment and supplies to be removable from the compartment, a particular configuration of FAP can be assembled prior to the FAP being despatched to an emergency situation. Prior to despatching the FAP, the compartment can be loaded with equipment and supplies which are appropriate for the particular emergency that has occurred and to which the FAP and its personnel will be attending. Emergencies which involve fire, water, chemical or the like elements each require different equipment and supplies for the treatment of casualties involved in such an emergency. Accordingly the FAP is configurable to a mode which is appropriate for the particular emergency to which it is attending. The compartment may alternatively be removable from the vehicle. Compartments of a pre-packed configuration may be selected from, to be engaged to the vehicle. Once engaged it will remain fixed to the vehicle during deployment.

The moveable panels are hinged along a hinge axis 3 which defines a substantially horizontal and longitudinally extending pivot axis for the panel relative to the fixed structure of the compartment. Where the end panel 16 is moveable, a hinge 31 at a pivot axis 30 which extends laterally to the longitudinal direction is provided to allow for this end panel to pivot relative to the fixed structure. The pivoting of the panels 2, 16 relative to the fixed structure from their closed condition to their open condition it a pivoting which is upwards and outwards from the fixed structure of the compartment. For the side panels this is, for example, in direction F shown in FIG. 1. Beneath the panel when in the extended condition an area H is established which is covered overhead by the panel where patients and medical aid personnel are able to be positioned. Patients are preferably supported on stretchers or beds 6 adjacent to the vehicle and below the extended panels.

The panels 2, 16 are maintained in an erected condition by a mechanical fastening means. The mechanical fastening means will extend between the fixed structure and the panel or between the panel and the ground, to support at least in part the weight of the panel to thereby keep it in its erected condition. A strut 5 may for example be engaged at its first distal end 8 to a post of the fixed structure of the compartment and at its other distal end 7 to a part of the panel as shown in FIG. 1. The strut when fixed at points on the posts and the panel will then prevent the panel from falling and collapsing to its stored and closed condition. The struts 5 may themselves be articulatable so that when in an articulated condition (not shown) the panels can move to the closed condition and when in a locked condition, the panels are maintained in the erected condition. Articulation of the struts can occur between the first and second distal ends and preferably mid way between such ends. An over centre toggle action of this articulated struts can be employed for locking the strut in its rigid and unarticulated condition. One or both distal ends of the struts may be disengable from the post or panel but have a quick fit relationship therewith. In an alternative form, the panel may have engaged thereto and away from the pivot axis 3, posts which extend between the panel and the ground on which the FAP is supported. Such posts may be removably engaged to the panel or may be permanently and pivotally engaged to the panel for the purposes of storage. Such posts in a pivotal relationship may collapse against the planar surface of the panel, the panel then being moved to its closed and stored condition.

Figure 10:
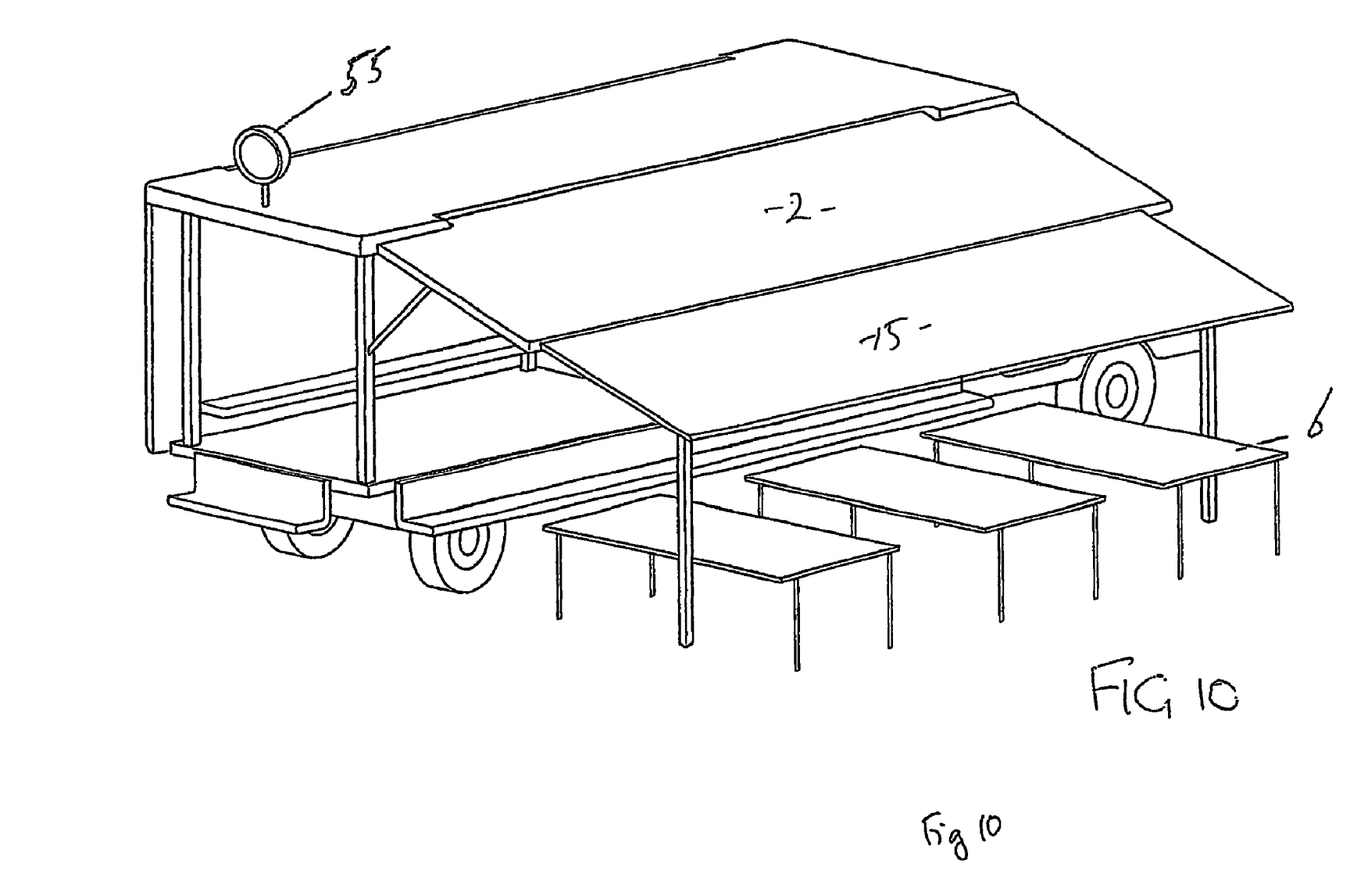
FIG. 10 is a perspective view of the FAP set up ready for use.

Lighting equipment 55 as for example shown in FIG. 10 may be provided to the compartment which can be utilised for lighting an area proximate to the FAP. Such lighting may be desirable to allow for casualties which are assembled in a triage area established away from the vehicle to be more visible where natural light is not sufficient.

In addition to the abovementioned features which the FAP of the present invention preferably incorporates, further detailed aspects of the FAP will now be described.

Medical Utilities

Figure 5:
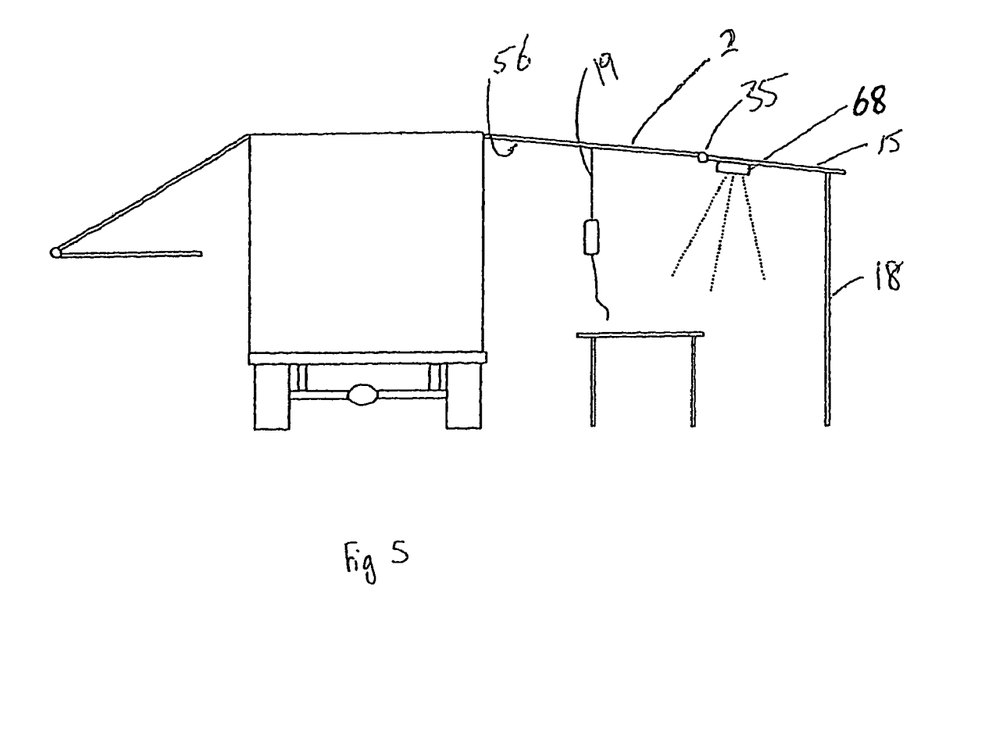
FIG. 5 is an end view of the FAP including a vehicle showing one side ready for use and the other partially erected.
Figure 6:
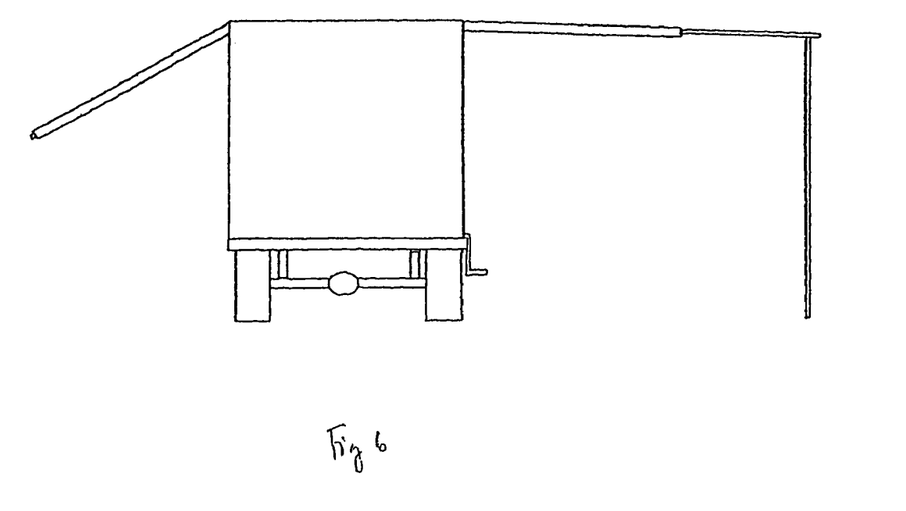
FIG. 6 is an end view of the FAP showing an alternative side panel structure including telescoping extension panels.
Figure 7:
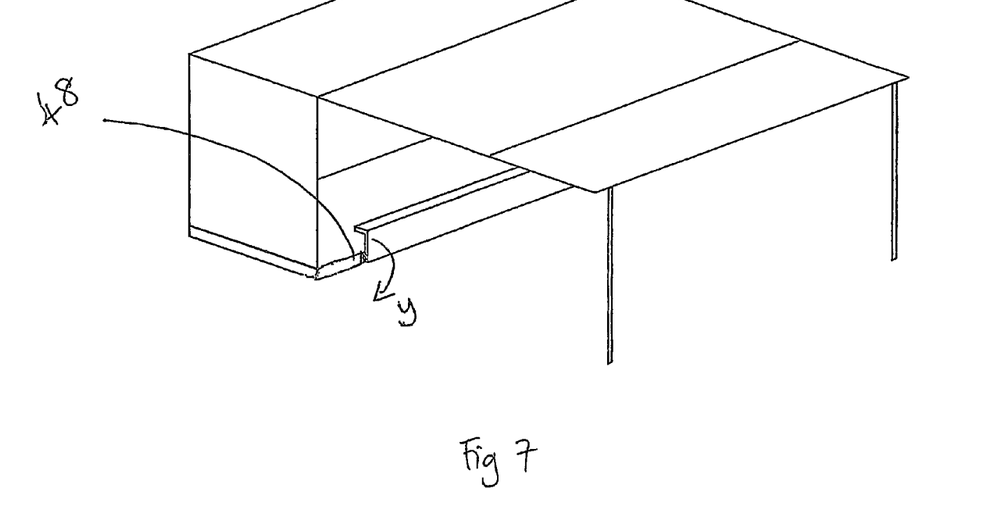
FIG. 7 is a perspective view of the FAP to be attached to a vehicle where one of the side panels has been extended for use and showing the side board in the transport position.
Figure 8:
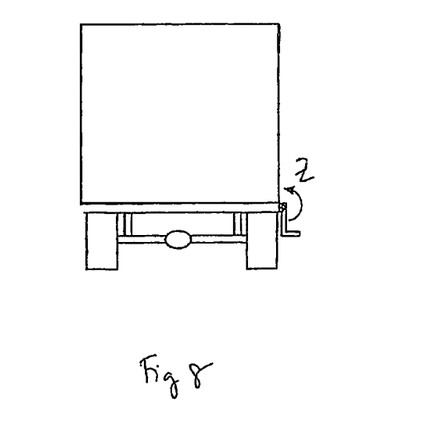
FIG. 8 is an end view of the FAP showing the movement of the side board to another position, to allow it to be used for the purposes of aiding the boarding of the compartment.

As well as allowing for the transportation of medical equipment and personnel to a first aid situation and establishing a first aid post at a destination, the first aid post is also set up to allow for the injured to be treated. The side panels 12 and perhaps also the end panel 16 when in an expanded condition establish a covered region below which personnel and injured can receive some shelter from the elements. The treatment of patients adjacent and proximate to the compartment of the FAP is desirable since it allows for medical treatment personnel to have rapid and easy access to supplies and equipment which are located within the enclosure of the compartment. Appropriate supplies and equipment can be within reach of a medic without having to leave the vicinity of the patient. Beds are able to be set up adjacent the vehicle and beneath the panels. In addition to the benefit of retrieving medical supplies and equipment from the compartment the panels 2 allow for medical utilities to be dispensed therefrom when in the erected condition. With reference to FIG. 5, the panel 2 has a lower surface 56 (when in the erected condition) from or at which there is provided access to medical utilities such as water, air, oxygen, suction, pressure, light, or other fluid or electricity which may be necessary for the treatment or monitoring of a patient.

Fluid conduits may extend from the enclosure of the compartment to an outlet/inlet provided at or approximate to the lower surface 56 of the panel 2. Such inlets or outlets may be fitted with a coupling onto which an extension conduit or pipe or tube can be engaged. The coupling may be a snap fitting, quick connection kind, screw or bayonet fitting or merely push fitting. The extension conduit can then extend from the lower surface of the panel 2, towards and gain access to the appropriate locations for the treatment of the patient. An extension conduit may for example include a mask attached to one of its distal ends and a coupling attached to another of its distal ends wherein the coupling of the extension conduit can engage to the coupling of the outlet at the panel 2. Such a conduit can then for example provide oxygen through the conduit at the panel and through the extension conduit towards the mask to allow for a patient to have access to oxygen. The conduits (whether for fluid or for electricity) extend either through or are engaged onto the lower surface of the panel and to a source of supply or control of the utility that is necessary. For example a water supply tank may be carried by the vehicle or compartment of the FAP. A conduit with an outlet accessible from the lower surface of the panel can extend to such a water supply tank. The tank may itself be pressurised or may utilise a pump for the displacement of water through the conduit towards its outlet end at the lower surface of the panel 2. Quick fit or snap fit connection terminals may also be provided at the other end of the conduits where the conduits are connected to the supply of the utility. E.g. quick fit connection couplings may be provided at the interior of the compartment and allow for oxygen tanks, water supply tanks or a connection to a water hydrant from another vehicle or from a reticulated source to be connected to the conduits. The reticulated water or gas source may hence also be plugged into the vehicle and piped via the conduits to the outlets for use treatment of a patient. Couplings preferably of a quick fit type, are chosen appropriate for the fluid which is to be dispensed or sucked via the conduit.

Connection terminals for the supply of electricity may also be disposed from or at the lower surface 56 of the panel 2. Connection terminals may allow for plugs or pins of a cable to be engaged. A cable can then provide an extension between the terminals and the device which requires the supply of electricity. For example, a defibrillator can be plugged into a socket disposed at the lower surface of the panel 2 wherein cables extend from the socket to equipment to control the supply of electricity for such a defibrillator. Monitoring equipment to monitor the heart and blood pressure or other conditions of the patient may also be plugged into designated sockets provided at the lower surface 56 of the panel 2.

Figure 13:
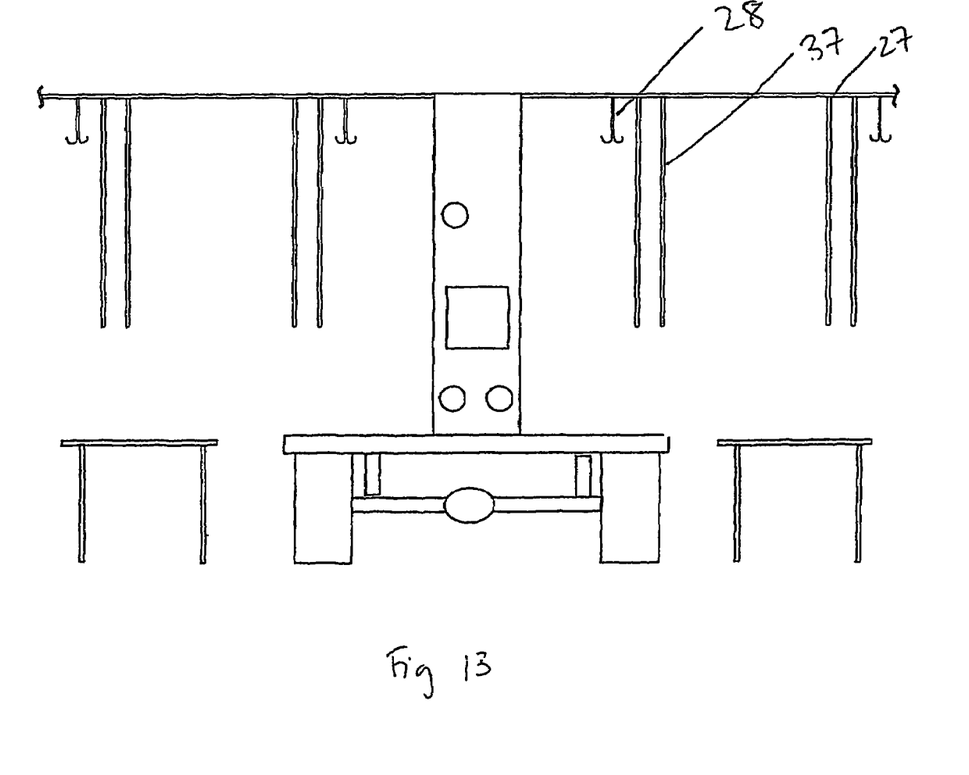
FIG. 13 is an end view of the alternative embodiment as depicted in FIG. 11 as setup ready for use.

In addition or alternatively, conduits including electrical conduits may in fact be retractably dispensed from the lower surface of the panel. Electrical cables for example may be stored within or against the panel in a coiled or rolled up form when stored. The outlet or device to be powered by such cables can in a stored condition, be located proximate to the lower surface 56 of the panel 2. When desired to be used they can be pulled by a user away from the panel thereby extending its length from the panel to allow it to be used for the treatment or monitoring of a patient. As seen in FIG. 13, conduits 37 are suspended from the lower surface of panel 3. However in the most preferred form, connection terminals socket or connectors 27 are provided at or approximate or disposed from the lower surface of the panel 2 onto which connection conduits can be engaged. Patients which may be treated at the FAP may arrive there in varying states of well-being and each patient may require different equipment for their treatment or monitoring. Such medical equipment for the treatment or monitoring may be stored within the compartment of the vehicle and can be retrieved by a medic thereafter plugged into the appropriate socket 27 and set up or used for the appropriate treatment or monitoring of the patient.

Flow control means such as valves or switches may in addition be provided at or approximate to the lower surface of the panel, to control the flow of the utility. The height of the lower surface of the panel is preferably within arms reach of a person standing below and on the surrounding ground.

A light source 68, such as for example, shown in FIG. 5 may also be provided for the direction of light towards the working area below the panel 2. A light source may be provided on the panel 2 or extendable from the panel 2 to be adjustable in position. Such a light source may for example be engaged to an arm which can be positioned to move the light source to an appropriate position for the direction of light at a desired angle onto the patient. Conduits for the delivery of utilities are preferably run in part within the panel 2.

Figure 14:
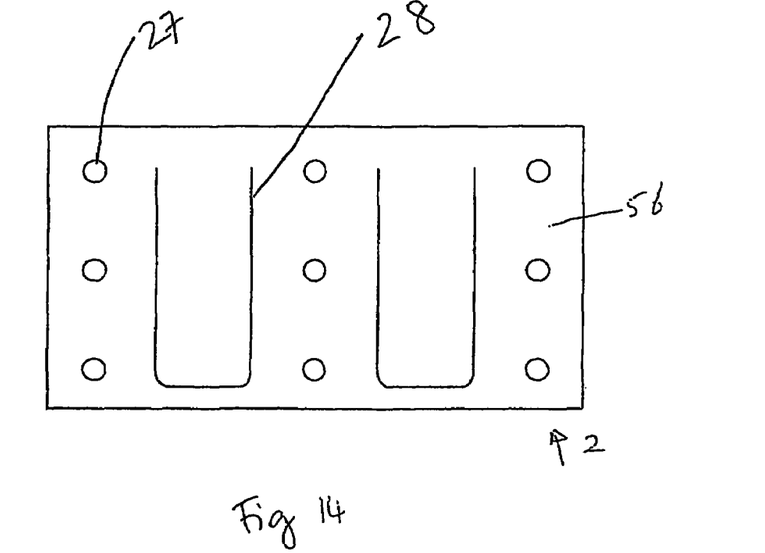
FIG. 14 is a view of the lower surface of a side wall of the FAP as shown in FIG. 1.
Figure 15:
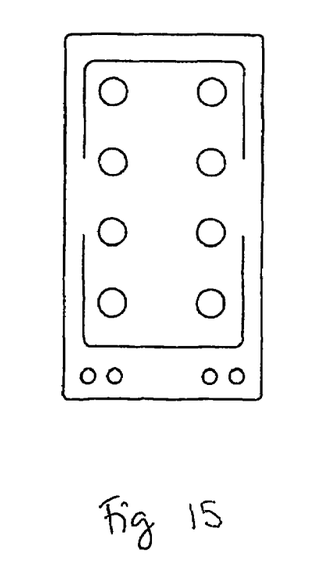
FIG. 15 is a view of the lower surface of a side panel as shown in FIG. 12.

With reference to FIGS. 14 and 15, examples of configurations of the lower surface 56 of the panel 2 are shown. Outlet or inlet openings dependent on whether it is for the delivery or suction of fluid or electricity are positioned at desired locations on the lower surface of the panel 2. A plurality of outlets for the provision of the same utilities may be provided at the lower surface of the panel as can be seen for example in FIG. 10. A region below the panel 2 may be established where a plurality of patients can be treated, and hence with the provisioning of a plurality of outlet/inlet, an appropriate medical utility can be provided proximate to each of the patients so that the supply of such utilities can remain reasonably orderly. For each patient bay, all of the utilities may be provided for each patient. Where both side panels are operable, one side may be used for surgical procedures where as the other may be provided for intensive care or monitoring of patients, or both sides may be set up identically.

Utilities appropriate to the particular use a bay or side of the vehicle will be put, can be provided by the panels.

The lower surface of the panel may also include a means for supporting a drip bag and related equipment. A drip bag for the intravenous delivery of fluids to a patient can be suspended from the lower surface of the panel as shown in FIG. 5. Such a support means may include a loop or means to hook 28 for fasten a suspension cord or cable which is engaged at the other end to the drip bag.

In the most preferred form, the support means for the bag comes in the form of a track or rail 28 which is located at the lower surface of the panel 2. Rails or tracks analogous to curtain rails can be secured to the lower surface of the panel or build into the lower surface of the panel. A carriage can run along the rail and from which the drip bag can be suspended. This allows for the drip bag to be adjustably positioned and suspended from the lower surface of the panel 2 so that the drip bag can be placed proximate to the point where the drip is engaged to the patient.

Extendible Overhead Coverage Panels

The area of coverage that the panel 2 or 6 may provide will be dependant on the height (top to bottom) of the panel (when in its closed condition). The width of coverage of the area below the panel when in the erected condition will correspond to the height of the panel when in its closed condition.

Figure 4:
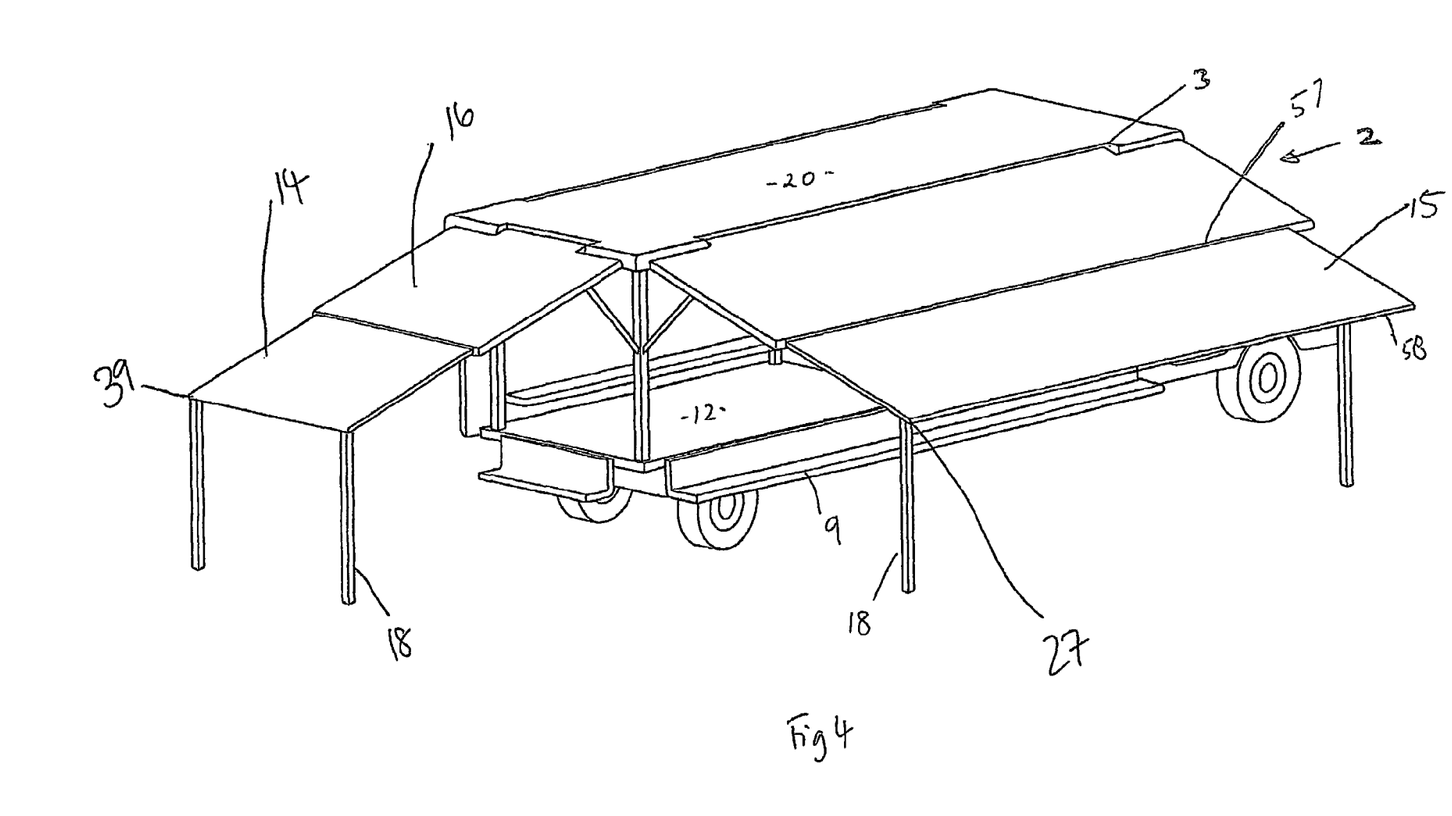
FIG. 4 is similar to that of FIG. 3 showing the telescoping extension panels.

Where, in the most preferred form the panel extends from the floor to the roof of the fixed structure of the compartment the width of coverage of area below the panel when in the expanded condition will approximately correspond to the height of the compartment. It may however be desirable or necessary that additional area for the treatment of patients is to be covered. Accordingly the present invention includes the provision of an extendible panel which is engaged to the main panel of the compartment. With reference to FIG. 4 it can be seen that an extension panel 15 extends entirely or partly from what is effectively the lower edge 57 of the main panel 2 (when in its closed condition) in the expanded condition as shown in FIG. 4. This edge is that edge of the main panel 2 opposite to the edge at the hinging structure 3. Where the main panel is rectangular, preferably planar and with the longer edges extending substantially longitudinally, the longitudinal edge 57 is that edge from which the extension panel 15 is disposed. In the extended condition the extension panel and the main panel define an enlarged coverage area which is larger than the height of the compartment. In the extended condition as shown in FIG. 4, the extension panel 15 and the main panel 2 have their planar orientation substantially parallel to each other. The planar orientation of these panels is preferable also substantially co-planar. However it may be that the plane of the extension panel 15 is at an angle to the plane of the main panel 2 when viewed in the longitudinal direction along the planes of the panels. The planes of the panels preferably remain parallel to the longitudinal direction.

The extension panel is moveable relative to the main panel to be extendible therefrom. It extends from the edge of the main panel opposite to the edge of the main panel engaged to the fixed structure of the compartment. The extension may either be by an articulation of the extension panel relative to the main panel or by a telescopic extension of the extension panel relative to the main panel. With reference to FIG. 5, the extension panel 15 is for example hingeably engaged at a hinge 35 to the main panel 2. The hinge is positioned intermediate of the main and extension panels and runs substantially longitudinally along and between the longitudinal edges of the main and extension panels. The hinge allows for the extension panel to be pivotal relative to the main panel 2 to move between a first rotational condition where the extension panel is in a storage condition, and a second rotational condition where the extension panel extends away from the main panel and away from the enclosure of the compartment. In the second rotational condition the extension panel defines an additional area of total coverage which is defined external of the vehicle by the panels carried by the vehicle. In the stored or first rotational condition the extension panel is preferably folded close to or against the main panel and where its plane is substantially parallel to that of the main panel but positioned adjacent thereto. In such a storage condition, the extension panel may be folded against the downward (or interior) surface 56 of the main panel 2. Alternatively is may be folded against the exterior (the opposite surface to the interior surface) of the panel 2.

Means to lock articulation of the extension panel relative to the main panel may be provided. Such means to lock may for example include a rigid mechanical bar that is engaged to both surfaces of both the main and extension panels and which extends across the hinge means 57, to lock the panels in the second rotational condition.

Alternatively or in addition, the extension panel may be supported by posts 18 which are located at or towards the longitudinal edge 58 of the extension panel opposite to the edge where the hinge structure is provided.

Fastening means to fasten the extension panel against the main panel when the extension panel is in the first rotational condition may be provide.

During the assembly of the FAP to an operative condition the main panel 2 may firstly be moved from its closed condition to an erected condition. The struts 5 may then be locked into place to support the main panel 2. Thereafter the extension panel is released from the main panel by the before mentioned fastening means to thereby allow the extension panel to swing downwardly and outwardly away from the main panel to its second rotational condition. The posts 18 can then be engaged to the extension panel to support this panel at its distal edge.

The articulatable extension panel is preferably of a size which is slightly smaller than the main panel such that when it is in its first or stored rotational condition, the boundaries of the extension panel are within the boundaries of the main panel 2. This is desirable where the main panel is the outermost panel of the arrangement. However where the extension panel 15 is located against the exterior of the main panel 2 in its first rotational condition, the extension panel 15 may be of a smaller or of a larger size than the main panel.

Alternative articulatable arrangements of the exterior panel may be apparent to a person skilled in the art including an arrangement where as opposed to a single pivot axis hinging structure, an alternative arrangement to allow for the extension panel to be pivotally engaged to the main panel may be provided. For example linkage arms between the main and extension panels may be utilised to allow for the main panel to articulate relative to the extension panel. Such linkage arms may be engaged at distal ends to respective panels away from the edge of the panels.

Regardless of the hinging mechanism that is used, the main panel and extension panel preferably form an overall enlarged panel region without any significant gap between the two panels. If a configuration is adopted where a gap does exist between the panels, a flexible panel may extend between the extension panel and the main panel so that rain or sun can not penetrate between the two panels.

In an alternative form, the extension panel is telescopically engaged to the main panel 2. In a telescopic arrangement, the planes of the main and extension panels are substantially parallel to each other. The extension panel is moveable from a first condition where it is retracted relative to the main panel (and preferably is substantially co-extensive with the main panel), to an extended condition where it is extended from the main panel from a side thereof which is opposite to the side which is engaged to the fixed structure of the compartment.

In the extended condition (achieved by effectively a linear movement relative to and from the main panel 2), the extension panel will have one of its longitudinal edges substantially proximate to the longitudinal edge of the main panel 2. Some overlap may remain. An opposite longitudinal edge 58 as for example shown in FIG. 4 will be placed outwardly and directed away from the main panel 2.

The telescopic relationship between the main panel 2 and the extension panel 15 may be such that in the retracted condition, the extension panel is located substantially within the main panel 2. The main panel 2 may for example consist of two walls, separated to define a cavity within which the extension panel is able to move. Alternatively the extension panel may be of a cross section to define a cavity within which the main panel can move.

As a further alternative, the extension panel may be telescopically slidable relative to the main panel either juxtaposed to the downwardly facing surface 56 or the upwardly facing surface of the main panel. Indeed where the extension panel 15 is slidable adjacent the downwardly facing surface, the extension panel may provide a cover to the outlets/inlets of the medical utilities disposed at the downwardly facing surface 56 of the main panel 2. Such a cover may be desirable particularly when the compartment is in the closed condition. Any personnel travelling within the compartment when the compartment. is closed by the side panels will then not be able to gain access or be able to touch or and accidentally damage the outlets/inlets or other medical services equipment provided at the surface 56 of the panel 2. The extension panel is in such a case overlapping part of the interior surface of the main panel and at least the utility outlets.

Where the side panel 2 (or end panel 15) is of a hollow structure, the provision of conduits for the supply of medical utilities accessible at the lower surface of the panel can also be provided therein.

With reference to FIG. 11, there is shown an extension panel which is made of a flexible sheet material 40. This sheet material is an alternative form of extension to the main panel 2. The flexible panel may be rolled up for storage and unrolled for providing extra cover from the vehicle. It may include a window region 44. The distal edge 50 of the extension panel 40 away from the main panel 2 may have a plurality of securing points 41 for securing guys 42 for the fixing of the extension panel 40 by, for example, pegs 43 to the surrounding terrain.

Fold out Sideboards

The FAP of the present invention may be utilised for transportation of medical personal to the emergency location. The compartment whilst carrying medical equipment and supplies may be designed to be sufficiently large to allow for such personnel to also be transported within the compartment. Seating arrangements are preferably provided which allow for a person to be sedentary thereon and for their feet to be placed on the floor 12.

In addition since the floor level of the compartment will be a reasonable height above the surrounding ground on which the Vehicle is positioned, to allow for a person to alight or board the enclosure, an intermediate step or steps may need to be provided. The inventors of the FAP have devised a sideboard 9 which is able to perform a dual role. In one position the side board acts as a seat for personnel within the compartment and in a second position to provide an intermediate step or steps to allow for personnel to conveniently move into and out of the compartment.

At least one sideboard is provided at or approximate to one of the edges of the floor panel 12 such as edge being an edge which when a corresponding side panel 2 or 16 of that side of the enclosure is moved to an erected condition, that edge becomes exposed to the exterior of the vehicle. A sideboard is hence not provided at the side where end panel 16 is provided since this end panel is not moveable to create an openings in a similar manner to the opening provided by the side panels 2 and preferably the end panels 16.

The or each sideboard 9 is pivotally engaged to the compartment or to the chassis of the vehicle about a pivot axis 60. The sideboard 9 can pivot in directions Y and Z about the pivot axis 60 between a position where it defines a seat within the compartment, to a condition where it provides a step intermediate of the surrounding ground 25 and the floor 12 of the compartment. In the seat defining condition, the sideboard 9 provides an upper surface 61 which is located substantially parallel to the plane of the floor but located above the plane of the floor. The seating surface 61 is located proximate to the inwardly facing surface 56 of the side panel when in the closed condition. Likewise where the sideboard is provided along the rear edge of the floor, the seating surface 61 is located adjacent the inwardly facing surface of the end panel 6. With the provision of the seating surface 61 proximate to the side and end panels, the side and end panels can provide a back support for a person sedentary on the sideboard.

The sideboard includes a vertically extending support section 62 which is pivotally engaged to the fixed structure of the compartment or chassis of the vehicle. The support section 62 is preferably in a substantially vertical position both in the mode where the sideboard is used for seating or for stepping. In the seating mode, the support 62 extends upwardly (preferably vertically) from the pivot 60 and in the step mode, extends downwardly from the pivot. The support structure 62 may be of a panel nature as shown in the drawings or alternatively it may be of a frame structure. Engaged to the support structure 62 at a location or locations thereof away from the pivot axis 60, is a step/seat structure 63. This structure has on one side the seating surface 61 and on the other side the stepping surface 65 as shown, for example, in FIG. 3. The stepping surface 65 when the sideboard is in the stepping condition is substantially horizontal.

Bracing between the seat/stepping structure 63 and the support section 62 may be provided to ensure that their relationship remains substantially fixed. However it may be that the seat/stepping structure 63 and the support section 62 are pivotal relative to each other but lockable in an appropriate condition so as to provide the seating and stepping features as and when desired.

The sideboard may provide in its stepping condition, more than one stepping surfaces 65. The sideboard may have two or more steps to provide a staircase to allow for personnel to have convenient walk on/walk off access to and from the compartment. The side boards may be inboard of the compartment relative to the panels when in the closed condition. Alternatively there may not be an overlap (in a horizontal direction) of the panels and the side boards.

The FAP may include one or more, in any combination, the features relating to the utility supply, the extendable overhead coverage panels or the moveable side board in addition to any other items, integers or features. Furthermore the extension panels may include the provision of medical utilities in a similar manner as herein described. Indeed it may merely be the extension panels which provide the outlets/inlets for the utilities.

The FAP of the present invention has the advantage of having a short set-up time after its arrival at an emergency destination. The movable panels are extended once the vehicle is stationary and in a desired location. The panels will be locked into place to retain their or its expanded configuration. This can be achieved by one or two persons or by the use of a hydraulic or pneumatic ram(s). The side boards may then be folded outwardly from the enclosure and be set up to provide a step for the users. Equipment can then be conveniently removed from the interior of the compartment. Beds for example can be erected to be placed adjacent the vehicle and below the extended panels to receive patients. Medical treatment or monitoring equipment can be connected to the outlets/inlets and become operational for their appropriate purposes. Sources of delivery of medical utilities are preferably positioned within said compartment such as water tanks with pumps, oxygen supplies or oxygen concentrators, a generator or battery ban for the supply of electricity, a compressor for compressed air or suction. As there is no significant amount of items to be handled to set the FAP up ready for use, the main advantage the FAP provides is ease and speed of set-up. This is vitally important in first aid situations as victims of accidents are most vulnerable during what is know as the "golden hour" after the accident occurring.

Whilst the preferred embodiments of the inventions have been illustrated and described herein, it is to be appreciated that various changes, rearrangements and. modifications may be made therein without departing from the scope of the invention as defined in the appending claims

The invention claimed is:

1. A mobile first aid post comprising
   a road vehicle
   a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition,
   wherein medical utilities selected from one or more of compressed air, suction, water, and oxygen are provided accessible by a user from a downwardly facing major surface of said at least one panel when in said erected condition for the purposes of or aiding in the treatment of patients positioned below said at least one panel.

2. A mobile first aid post as claimed in claim 1 wherein said at least one panel includes a conduit for each of said medical utilities to allow utilisation of said medical utility below said at least one panel when in said erected condition, said conduit extending between a first end at or disposed from said downwardly facing major surface of said at least one panel and a second end engaged or engagable to a source for the supply of said utility carried by said vehicle.

3. A mobile first aid post as claimed in claim 2 wherein each said first ends of said conduit(s) are located at said at least one panel and are presented to allow for convenient engagement of an extension conduit thereto, such that each extension conduit can hang down from said panel and can be manipulated by a user for appropriate positioning to deliver the medical utility as desired.

4. A mobile first aid post as claimed in claim 3 wherein said extension conduit is a flexible conduit.

5. A mobile first aid post as claimed in claim 1 wherein said at least one panel at said downwardly facing major surface includes lighting means which can be energised for the provision of light to the area below said at least one panel when in the erected condition.

6. A mobile first aid post as claimed in claim 2 wherein said conduit(s) are dependent from said at least one panel in an extendable manner therefrom, able to be drawn by a user as and when desired from said panel and retractable therewithin when not desired for use.

7. A mobile first aid post as claimed in claim 1 wherein said fixed structure of said compartment includes a floor structure and a frame defining cage structure extending from said floor structure to support vertical side walls, and a roof defining said enclosure,
   said at least one panel forming part of at least one side wall and hinged relative to said frame structure at or proximate to said roof about a horizontal axis.

8. A mobile first aid post as claimed in claim 1 wherein said compartment is engaged to said vehicle positioned above the axles of said vehicle and extends longitudinally with respect to said vehicle from the rear of the vehicle and towards the front of said vehicle, the compartment when in the closed condition, being of a width (lateral to said longitudinal direction) substantially similar to the width of said vehicle.

9. A mobile first aid post comprising
   a road vehicle;
   a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition,
   wherein one or more of said at least one panel includes means for supply of medical utilities selected from one or more of compressed air, suction, water, and oxygen which are accessible by a user for the treatment of patients from a downwardly facing major surface of the one or more of said at least one panel when in said erected condition; and
   wherein an extension panel is movably engaged to each said at least one movable panel to move between a collapsed condition and an expanded condition wherein said extension panel is outwardlying of said at least one panel and said enclosure to define a total said region covered overhead greater than that provided by said at least one panel alone.

10. A mobile first aid post as claimed in claim 9 wherein said extension panel is a rigid panel and when in a collapsed condition overlies said at least one movable panel.

11. A mobile first aid post as claimed in claim 9 wherein said extension panel is horizontally hinged to said at least one movable panel to overly one of said major surfaces of said at least one panel when in said collapsed condition.

12. A mobile first aid post as claimed in claim 9 wherein said extension panel is hinged to said at least one panel to extend in said extended condition, substantially parallel to said at least one panel.

13. A mobile first aid post as claimed in claim 9 wherein a straight edge of said extension panel is engaged to a straight edge of said at least one movable panel.

14. A mobile first aid post comprising:

a road vehicle;

a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition; and wherein an extension panel is movably engaged to each said at least one movable panel to move between a collapsed condition and an expanded condition wherein said extension panel is outwardlying of said at least one panel and said enclosure to define a total said region covered overhead greater than that provided by said at least one panel alone, wherein said extension panel is telescopically movable to said at least one panel.

15. A mobile first aid post as claimed in claim 14 wherein said at least one panel includes a cavity into which said extension panel is able to be retracted.

16. A mobile first aid post as claimed in claim 9 wherein said at least one panel is of a quadrilateral plan shape and said extension panel is of a slightly smaller plan shape to said at least one panel.

17. A mobile first aid post as claimed in claim 9 wherein said at least one panel and said extension panel are in an edge to edge juxtaposition to each other when in the expanded condition without any significant gap existing between said at least one panel and said extension panel.

18. A mobile first aid post comprising:

a road vehicle;

a compartment carried by said vehicle, defining a generally boxed shaped openable enclosure for housing medical supplies and equipment, said compartment including a fixed structure and at least one rigid movable panel which is movable relative to said fixed structure between a condition closing a side of said enclosure (hereinafter "closed condition") wherein said panel defines at least part of a side wall of said enclosure and an erected condition wherein said at least one panel is in a substantially or near horizontal condition and thereby creating an opening for said enclosure, said at least one panel movable in a pivoting manner to said fixed structure to extend outwardlying from said enclosure and above said opening to provide a region covered overhead by said at least one panel for a person positioned adjacent said side of said vehicle where said at least one panel is provided and positioned when in said erected condition, said panel providing an opening to said enclosure when in said erected condition which extends substantially to a floor of said enclosure; and a seat structure pivotably mounted to said fixed structure proximate or at said floor to, in a first pivotal condition present a substantially horizontal support surface above the surface of said floor to allow a person within said enclosure to be sedentary thereon and in a second pivotal condition different to the first, present a substantially horizontal surface intermediate of said floor and the ground adjacent said vehicle to allow a person to be supported thereon, wherein the seat structure has an absence of support from the ground external to the compartment in said second pivotal condition.

19. A mobile first aid post as claimed in claim 18 wherein said seat structure includes a first member engaged to said floor at a pivot means and a seat member rigidly extending from said first member, said seat member has in said first rotational condition, a first surface thereof positioned substantially horizontally and upwardly facing within said enclosure to allow a person to be sedentary thereon and a second surface opposite to said first surface positioned horizontally and upwardly facing when said seat structure in said second rotational condition and located substantially outwardly of said enclosure to present said second horizontal surface as a step between said floor structure and the ground on which said vehicle is positioned.

20. A mobile first aid post as claimed in claim 18 wherein seat structure is engaged to said floor structure to be entirely within said enclosure in said first rotational condition.

21. A mobile first aid post as claimed in claim 18 wherein said seat structure can be rotated in an outwardly and downwardly direction relative to said compartment to said second rotational condition and is supported when in said second rotational condition against any further rotation.

22. A mobile first aid post as claimed in claim 18 wherein said floor of said compartment is positioned at a height above said surrounding ground to said vehicle which is substantially twice the height of said second surface of said seat structure above said surrounding ground when in said second rotational condition.

* * * * *